(12) United States Patent
Westermann

(10) Patent No.: US 6,307,886 B1
(45) Date of Patent: Oct. 23, 2001

(54) DYNAMICALLY DETERMINING GROUP OF PICTURE SIZE DURING ENCODING OF VIDEO SEQUENCE

(75) Inventor: Edward F. Westermann, Endicott, NY (US)

(73) Assignee: International Business Machines Corp., Armonk, NY (US)

(*) Notice: Subject to any disclaimer, the term of this patent is extended or adjusted under 35 U.S.C. 154(b) by 0 days.

(21) Appl. No.: 09/009,559

(22) Filed: Jan. 20, 1998

(51) Int. Cl.[7] ..................................................... H04B 1/66
(52) U.S. Cl. .............................. 375/240.09; 375/240.12; 375/240.14; 382/236
(58) Field of Search ........................ 348/404.1, 405.1, 348/409.1, 412.1, 420.1, 699, 700; 382/236, 239, 250; 375/240, 240.12, 240.2, 240.04, 240.06, 240.13, 240.14, 240.15, 240.16, 240.25, 240.26, 240.27; H04B 1/66; H04N 7/12

(56) References Cited

U.S. PATENT DOCUMENTS

| | | | |
|---|---|---|---|
| 4,729,021 | 3/1988 | Kondo | 358/135 |
| 4,802,005 | 1/1989 | Kondo | 358/135 |
| 4,845,560 | 7/1989 | Kondo et al. | 358/133 |
| 5,068,726 | 11/1991 | Kondo et al. | 358/135 |
| 5,193,003 | 3/1993 | Kondo | 358/136 |
| 5,329,365 | 7/1994 | Uz | 348/469 |
| 5,410,354 | 4/1995 | Uz | 348/426 |
| 5,508,750 | 4/1996 | Hewlett et al. | 348/558 |
| 5,535,008 | 7/1996 | Yamagishi et al. | 358/342 |
| 5,617,145 * | 4/1997 | Huang et al. | 348/423 |
| 5,793,895 * | 8/1998 | Chang et al. | 382/236 |
| 5,861,922 * | 1/1999 | Murashita et al. | 348/420.1 |
| 5,978,029 * | 11/1999 | Boice et al. | 375/240 |
| 5,990,955 * | 11/1999 | Koz | 348/390 |
| 6,040,861 * | 3/2000 | Boroczky et al. | 375/240.16 |
| 6,064,436 * | 5/2000 | Okada | 348/416 |
| 6,097,757 * | 8/2000 | Boice et al. | 375/240 |

FOREIGN PATENT DOCUMENTS

| | | |
|---|---|---|
| 0 705 041 A2 | 4/1996 | (EP) . |
| 06054315A | 2/1994 | (JP) . |
| 06054319A | 2/1994 | (JP) . |
| 7-095571 | 7/1995 | (JP) . |
| WO 95/20863 | 8/1995 | (WO) . |

* cited by examiner

Primary Examiner—Chris Kelley
Assistant Examiner—Tung Vo
(74) Attorney, Agent, or Firm—Heslin & Rothenberg, P.C.; Kevin P. Radigan, Esq.; William H. Steinberg, Esq.

(57) ABSTRACT

Method, system and computer program product are provided for dynamically determining group of picture (GOP) size as a function of picture change activity within a sequence of video frames. Image statistics on one or more intraframe characteristics of the sequence of video frames is compared to a preset threshold for deciding whether to continue within an existing GOP or to begin a new GOP. A frame of the sequence of video frames is intra-coded, and each of a variable number of subsequent frames is bi-directionally predictive-coded (B). Each B frame subsequent to the I frame is encoded employing forward prediction motion estimation only from the I frame. When a predefined picture degradation occurs, a new GOP is initiated. One example of an intraframe characteristic to be monitored is the number of intra-coded macroblocks within each B coded frame. This number is compared against a threshold number, which may be a percentage of the total number of macroblocks within the frame.

13 Claims, 6 Drawing Sheets

DYNAMICALLY DETERMINING GROUP OF PICTURE SIZE DURING ENCODING OF VIDEO SEQUENCE

TECHNICAL FIELD

The present invention relates in general to compression of digital visual images, and more particularly, to a technique for using image statistics during encoding of a video sequence to dynamically determine group of picture (GOP) size as a function of picture change activity within the sequence of video frames.

BACKGROUND OF THE INVENTION

Within the past decade, the advent of world-wide electronic communications systems has enhanced the way in which people can send and receive information. In particular, the capabilities of real-time video and audio systems have greatly improved in recent years. In order to provide services such as video-on-demand and video conferencing to subscribers, an enormous amount of network bandwidth is required. In fact, network bandwidth is often the main inhibitor in the effectiveness of such systems.

In order to overcome the constraints imposed by networks, compression systems have emerged. These systems reduce the amount of video and audio data which must be transmitted by removing redundancy in the picture sequence. At the receiving end, the picture sequence is uncompressed and may be displayed in real-time.

One example of an emerging video compression standard is the Moving Picture Experts Group ("MPEG") standard. Within the MPEG standard, video compression is defined both within a given picture and between pictures. Video compression within a picture is accomplished by conversion of the digital image from the time domain to the frequency domain by a discrete cosine transform, quantization, and variable length coding. Video compression between pictures is accomplished via a process referred to as motion estimation and compensation, in which a motion vector plus difference data is used to describe the translation of a set of picture elements (pels) from one picture to another.

The ISO MPEG-2 standard specifies only the syntax of bitstream and semantics of the decoding process. The choice of coding parameters and tradeoffs in performance versus complexity are left to the encoder developers.

In video applications, it is advantageous to optimize encoding of digital signals in order to obtain the best density or compression of data. There are a number of known techniques to accomplish encoding, however there is an increasing need for techniques to compress video data at low bit rates to overcome bandwidth constraints on networks, while still maintaining picture quality. This invention seeks to meet this need by providing an encode technique which optimizes variable bit rate bandwidth while maintaining picture quality, especially at low bit rates and low motion video applications such as surveillance, distance learning, and video conferencing.

DISCLOSURE OF THE INVENTION

Briefly summarized, this invention comprises in one aspect a method for encoding a sequence of video frames which includes: encoding the sequence of video frames to produce an encoded bitstream; and simultaneous with the encoding, dynamically determining as a function of activity within the sequence of video frames a group of picture (GOP) length for at least one GOP of the encoded bitstream.

More particularly, the invention may include (in one embodiment) encoding a frame of the sequence of video frames as an intra-coded (I) frame and employing forward prediction motion estimation based on the encoded I frame for each frame of a variable number of frames temporally subsequent to the encoded I frame. Wherein, the I frame and the variable number of frames temporally subsequent thereto comprise the GOP length of the at least one GOP. Preferably, each frame of the variable number of frames is encoded as a bi-directionally predictive-coded (B) frame.

In another aspect, the invention comprises a method for encoding a sequence of video frames. This method includes: encoding a frame of the sequence of video frames for use as a reference frame; encoding subsequent frames of the sequence of video frames using motion estimation based on the reference frame; and during the encoding of subsequent frames, for each frame thereof comparing at least one frame characteristic of that frame to a preset threshold and dynamically determining therefrom an encode picture type for a next frame of the subsequent frames. Again, the reference frame preferably comprises an intra-coded (I) frame and each frame of the subsequent frames is a bi-directionally predictive-coded (B) frame.

Systems and articles of manufacture corresponding to the above-outlined methods are also described and claimed herein in accordance with the principles of this invention.

To restate, presented is a technique for dynamically determining a group of picture size during encoding of a sequence of video frames. By dynamically varying the group of picture size, bit rate bandwidth can be optimized and picture quality maintained, especially at low bit rates and low motion within the video sequence. Thus, this invention comprises a technique to maximize temporal redundancy in low bit rate, low motion video applications such as surveillance, distance learning, and video conferencing. The technique is described below with reference to the MPEG video compression standard, but is equally applicable to other standards involving motion estimation and motion compensation. Dynamic generation of GOP size within an MPEG video stream is obtained by stringing forward predicted only "B" pictures together until a threshold number of intra-macroblocks are coded, triggering a new "I" frame encode, and initiating a new GOP. The number of intra-macroblocks within a frame comprises one example of an intraframe characteristic which can be monitored as representative of picture change activity, and used to detect picture degradation.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

Figure 1:
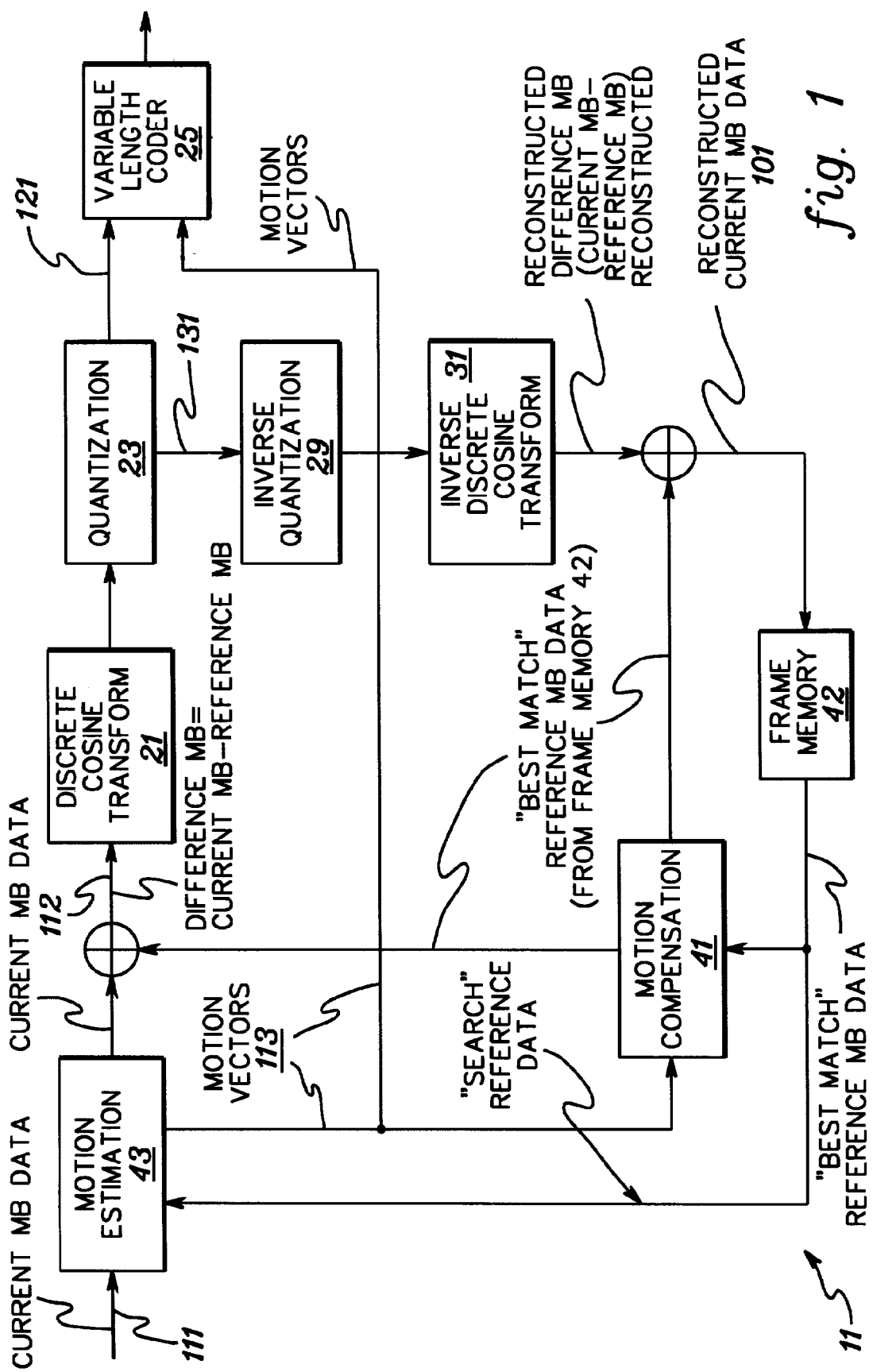
FIG. 1 shows a flow diagram of a generalized MPEG-2 compliant encoder 11, including a discrete cosine transformer 21, a quantizer 23, a variable length coder 25, an inverse quantizer 29, an inverse discrete cosine transformer 31, motion compensation 41, frame memory 42, and motion estimation 43. The data paths include the $i^{th}$ picture input 111, difference data 112, motion vectors 113 (to motion compensation 41 and to variable length coder 25), the picture output 121, the feedback picture for motion estimation and compensation 131, and the motion compensated picture 101. This figure has the assumptions that the $i^{th}$ picture exists in frame memory or frame store 42 and that the i+1$^{th}$ picture is being encoded with motion estimation.

The invention relates, for example, to MPEG compliant encoders and encoding processes such as described in "Information Technology-Generic coding of moving pictures and associated audio information: Video," Recommendation ITU-T H.262, ISO/IEC 13818-2, Draft International Standard, 1994. The encoding functions performed by the encoder include data input, spatial compression, motion estimation, macroblock type generation, data reconstruction, entropy coding, and data output. Spatial compression includes discrete cosine transformation (DCT), quantization, and entropy encoding. Temporal compression includes intensive reconstructive processing, such as inverse discrete cosine transformation, inverse quantization, and motion compensation. Motion estimation and compensation are used for temporal compression functions. Spatial and temporal compression are repetitive functions with high computational requirements.

More particularly the invention relates, for example, to a process for performing spatial and temporal compression including discrete cosine transformation, quantization, entropy encoding, motion estimation, motion compensation, and prediction, and even more particularly to a system for accomplishing spatial and temporal compression.

The first compression step is the elimination of spatial redundancy, for example, the elimination of spatial redundancy in a still picture of an "I" frame picture. Spatial redundancy is the redundancy within a picture. The MPEG-2 Draft Standard is using a block based method of reducing spatial redundancy. The method of choice is the discrete cosine transformation, and discrete cosine transform coding of the picture. Discrete cosine transform coding is combined with weighted scalar quantization and run length coding to achieve desirable compression.

The discrete cosine transformation is an orthogonal transformation. Orthogonal transformations, because they have a frequency domain interpretation, are filter bank oriented. The discrete cosine transformation is also localized. That is, the encoding process samples on an 8×8 spatial window which is sufficient to compute 64 transform coefficients or sub-bands.

Another advantage of the discrete cosine transformation is that fast encoding and decoding algorithms are available. Additionally, the sub-band decomposition of the discrete cosine transformation is sufficiently well behaved to allow effective use of psychovisual criteria.

After transformation, many of the frequency coefficients are zero, especially the coefficients for high spatial frequencies. These coefficients are organized into a zig-zag or alternate-scanned pattern, and converted into run-amplitude (run-level) pairs. Each pair indicates the number of zero coefficients and the amplitude of the non-zero coefficient. This is coded in a variable length code.

Motion compensation is used to reduce or even eliminate redundancy between pictures. Motion compensation exploits temporal redundancy by dividing the current picture into blocks, for example, macroblocks, and then searching in previously transmitted pictures for a nearby block with similar content. Only the difference between the current block pels and the predicted block pels extracted from the reference picture is actually compressed for transmission and thereafter transmitted.

The simplest method of motion compensation and prediction is to record the luminance and chrominance, i.e., intensity and color, of every pixel in an "I" picture, then record changes of luminance and chrominance, i.e., intensity and color for every specific pixel in the subsequent picture. However, this is uneconomical in transmission medium bandwidth, memory, processor capacity, and processing time because objects move between pictures, that is, pixel contents move from one location in one picture to a different location in a subsequent picture. A more advanced idea is to use a previous or subsequent picture to predict where a block of pixels will be in a subsequent or previous picture or pictures, for example, with motion vectors, and to write the result as "predicted pictures" or "P" pictures. More particularly, this involves making a best estimate or prediction of where the pixels or macroblocks of pixels of the i$^{th}$ picture will be in the i−1$^{th}$ or i+1$^{th}$ picture. It is one step further to use both subsequent and previous pictures to predict where a block of pixels will be in an intermediate or "B" picture.

To be noted is that the picture encoding order and the picture transmission order do not necessarily match the picture display order. See FIG. 2. For I-P-B systems the input picture transmission order is different from the encoding order, and the input pictures must be temporarily stored until used for encoding. A buffer stores this input until it is used.

For purposes of illustration, a generalized flowchart of MPEG compliant encoding is shown in FIG. 1. In the flowchart the images of the i$^{th}$ picture and the i+1$^{th}$ picture are processed to generate motion vectors. The motion vectors predict where a macroblock of pixels will be in a prior and/or subsequent picture. The use of the motion vectors is a key aspect of temporal compression in the MPEG standard. As shown in FIG. 1 the motion vectors, once generated, are used for the translation of the macroblocks of pixels, from the i$^{th}$ picture to the i+1$^{th}$ picture.

As shown in FIG. 1, in the encoding process, the images of the it picture and the i+1$^{th}$ picture are processed in the encoder 11 to generate motion vectors which are the form in which, for example, the i+1$^{th}$ and subsequent pictures are encoded and transmitted. An input image 111 of a subsequent picture goes to the motion estimation unit 43 of the encoder. Motion vectors 113 are formed as the output of the motion estimation unit 43. These vectors are used by the motion compensation unit 41 to retrieve macroblock data from previous and/or future pictures, referred to as "reference" data, for output by this unit.

One output of the motion compensation unit 41 is negatively summed with the output from the motion estimation unit 43 and goes to the input of the discrete cosine transformer 21. The output of the discrete cosine transformer 21 is quantized in a quantizer 23. The output of the quantizer 23 is split into two outputs, 121 and 131; one output 121 goes to a downstream element 25 for further compression and processing before transmission, such as to a run length encoder; the other output 131 goes through reconstruction of the encoded macroblock of pixels for storage in frame memory 42. In the encoder shown for purposes of illustration, this second output 131 goes through an inverse quantization 29 and an inverse discrete cosine transform 31 to return a lossy version of the difference macroblock. This data is summed with the output of the motion compensation unit 41 and returns a lossy version of the original picture to the frame memory 42.

Figure 2:
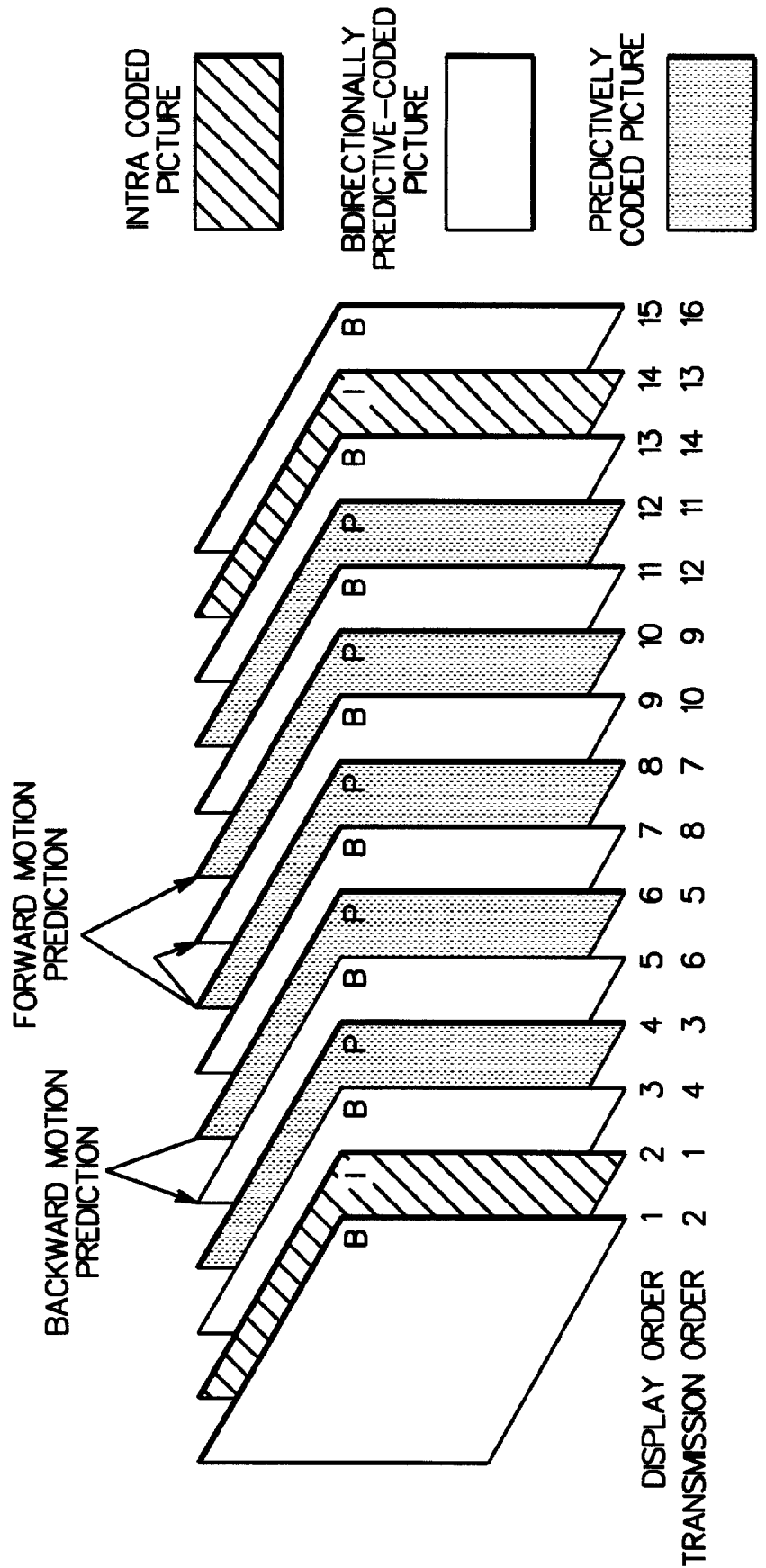
FIG. 2 illustrates the I, P, and B pictures, examples of their display and transmission orders, and forward, and backward motion prediction.

As shown in FIG. 2, there are three types of pictures. There are "Intra pictures" or "I" pictures which are encoded and transmitted whole, and do not require motion vectors to be defined. These "I" pictures serve as a reference image for motion estimation. There are "Predicted pictures" or "P" pictures which are formed by motion vectors from a previous picture and can serve as a reference image for motion estimation for further pictures. Finally, there are "Bidirectional pictures" or "B" pictures which are formed using motion vectors from two other pictures, one past and one future, and can not serve as a reference image for motion estimation. Motion vectors are generated from "I" and "P" pictures, and are used to form "P" and "B" pictures.

Figure 3:
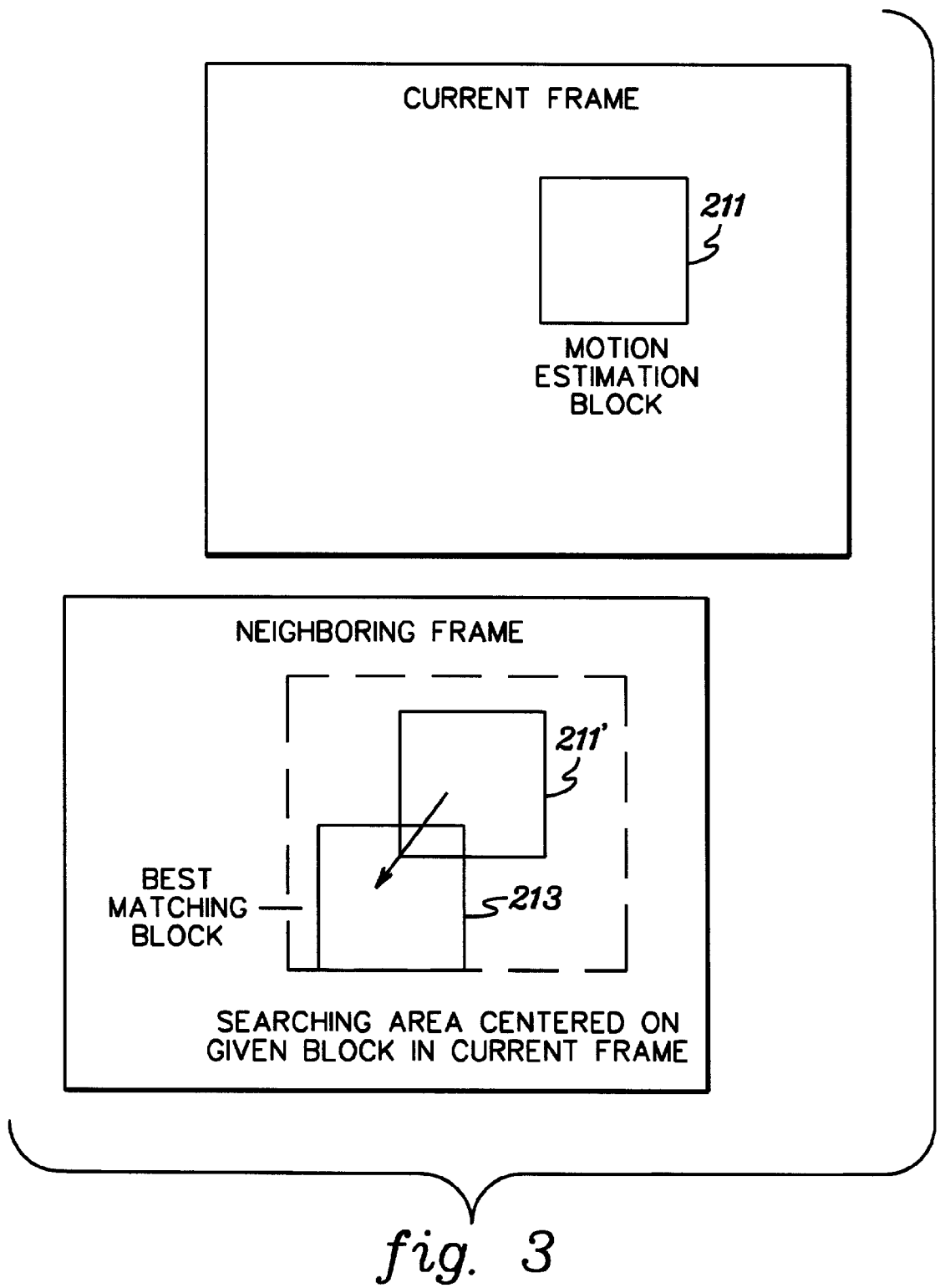
FIG. 3 illustrates the search from the motion estimation block in the current frame or picture to the best matching block in a subsequent or previous frame or picture. Elements 211 and 211' represent the same location in both pictures.
Figure 4:
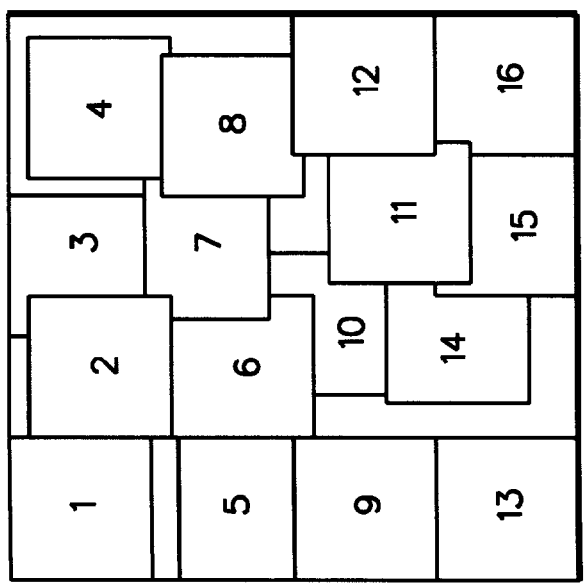
FIG. 4 illustrates the movement of blocks in accordance with the motion vectors from their position in a previous picture to a new picture, and the previous picture's blocks adjusted after using motion vectors.

One method by which motion estimation is carried out, shown in FIG. 3, is by a search from a macroblock 211 of an $i^{th}$ picture throughout a region of the next picture to find the best match macroblock 213. Translating the macroblocks in this way yields a pattern of macroblocks for the $i+1^{th}$ picture, as shown in FIG. 4. In this way the $i^{th}$ picture is changed a small amount, e.g., by motion vectors and difference data, to generate the $i+1^{th}$ picture. What is encoded are the motion vectors and difference data, and not the $i+1^{th}$ picture itself. Motion vectors translate position of an image from picture to picture, while difference data carries changes in chrominance, luminance, and saturation, that is, changes in shading and illumination.

Returning to FIG. 3, we look for a good match by starting from the same location in the $i^{th}$ picture as in the $i+1^{th}$ picture. A search window is created in the $i^{th}$ picture. We search for a best match within this search window. Once found, the best match motion vectors for the macroblock are coded. The coding of the best match macroblock includes a motion vector, that is, how many pixels in the y direction and how many pixels in the x direction is the best match displaced in the next picture. Also encoded is difference data, also referred to as the "prediction error", which is the difference in chrominance and luminance between the current macroblock and the best match reference macroblock.

The operational functions of an MPEG-2 encoder are discussed in greater detail in commonly assigned, co-pending U.S. patent application Ser. No. 08/831,157, by Carr et al., filed Apr. 1, 1997, entitled "Control Scheme For Shared-Use Dual-Port Predicted Error Array," which is hereby incorporated herein by reference in its entirety.

As noted initially, encoder performance and/or picture quality may be enhanced in accordance with the principles of this invention by dynamically determining group of picture size during encoding of a sequence of video frames for each sequential GOP. The technique includes encoding a single frame to be used as a reference for future frame encoding, and encoding subsequent frames using motion estimation based only on this reference frame. At least one intraframe characteristic is determined with encoding of each subsequent frame and compared to a preset threshold. This comparison allows the encoder to dynamically determine the encoding picture type for the next temporally encoded frame, i.e., whether to continue encoding within a present group of pictures (GOP) or to begin a next GOP.

As noted, FIG. 2 depicts a typical MPEG group of pictures (GOP) consisting of intra (I), predicted (P), and bi-directional (B) frames. This typical GOP consists of a fixed number of pictures, with the number of I, P and B occurrences and positions thereof also being fixed within a GOP. In display order, the P picture number 4 will use as its motion estimation reference I picture number 2. B picture number 3 will use either (or both) I picture number 2 and P picture number 4 as its reference(s). Pursuant to MPEG video compression standard, a B picture is not used as a reference.

I and P pictures, because they serve as reference pictures, are typically allocated more bits to encode than B pictures. Thus, a video sequence encoded at 4,000,000 bits per second and at 30 frames per second, would allocate 200,000 bits to each picture, assuming a uniform allocation. A typical application, however, is for the I pictures to be allocated 4× as many bits as the B pictures, and the P pictures to be allocated 2× as many bits as the B pictures. Thus, the greater the number of non-B pictures in a GOP, the greater number of bits needed to encode that GOP.

Figure 5:
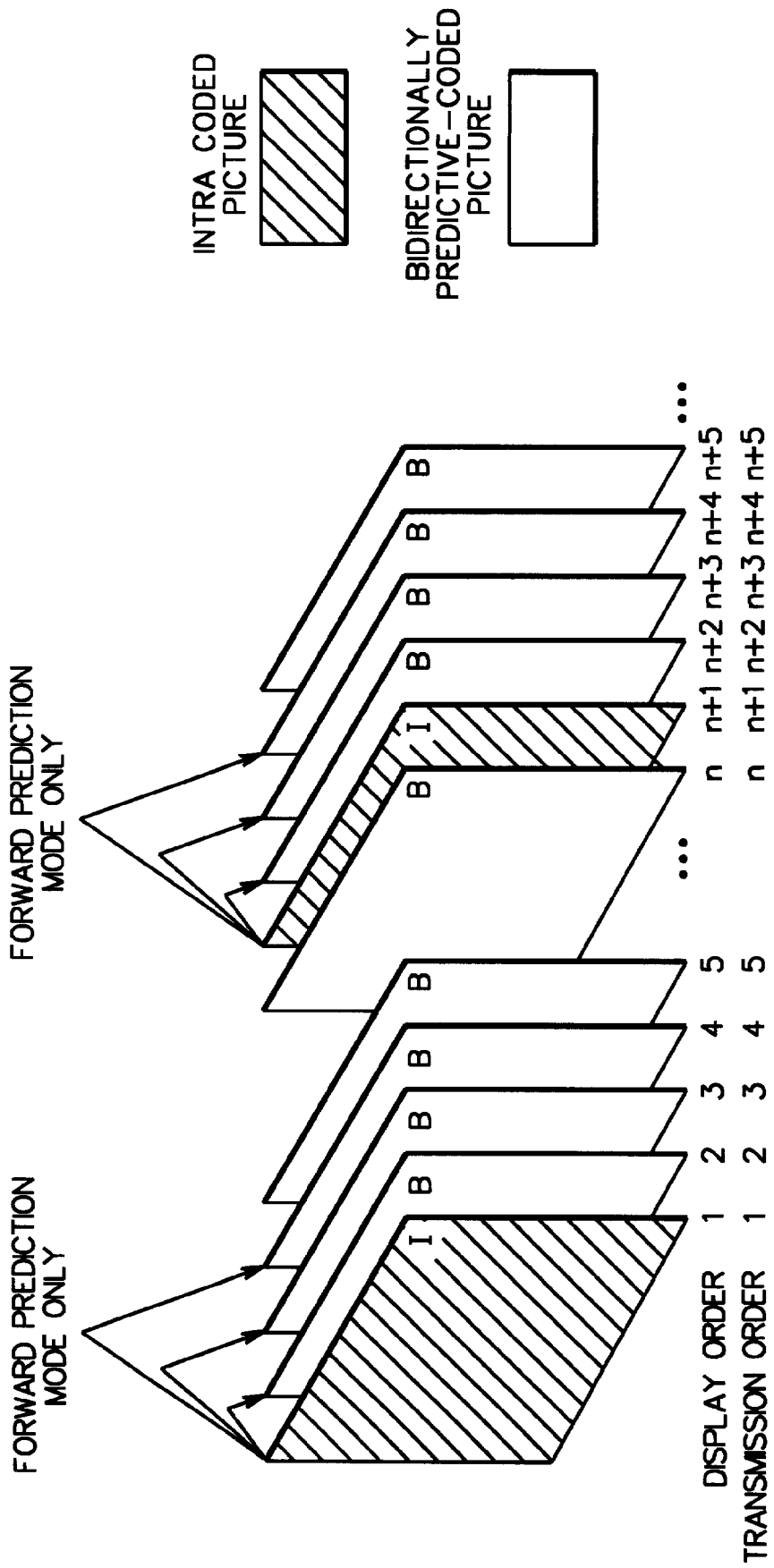
FIG. 5 illustrates examples of variable size I and B groups of pictures (GOPs) dynamically determined in accordance with the present invention using forward prediction motion estimation only.

FIG. 5 illustrates variable length group of picture encoding in accordance with this invention. Each GOP consists of one I frame followed by a dynamically determined number of B frames. Each B frame uses forward prediction only, i.e., it refers to an I frame reference that is previous to it temporally. Thus, the first picture is encoded as intra (I(1)) and serves as the motion estimation reference for subsequent pictures B(2)–B(n). As each B picture is encoded, at least one intraframe characteristic (such as the number of intra-coded macroblocks) is recorded and compared to a predetermined threshold. When the monitored characteristic exceeds the threshold, as in picture B(n), a new group of pictures (GOP) is started, the next following picture is coded as an I frame (as in I(n+1)), and the process is repeated.

Figure 6:
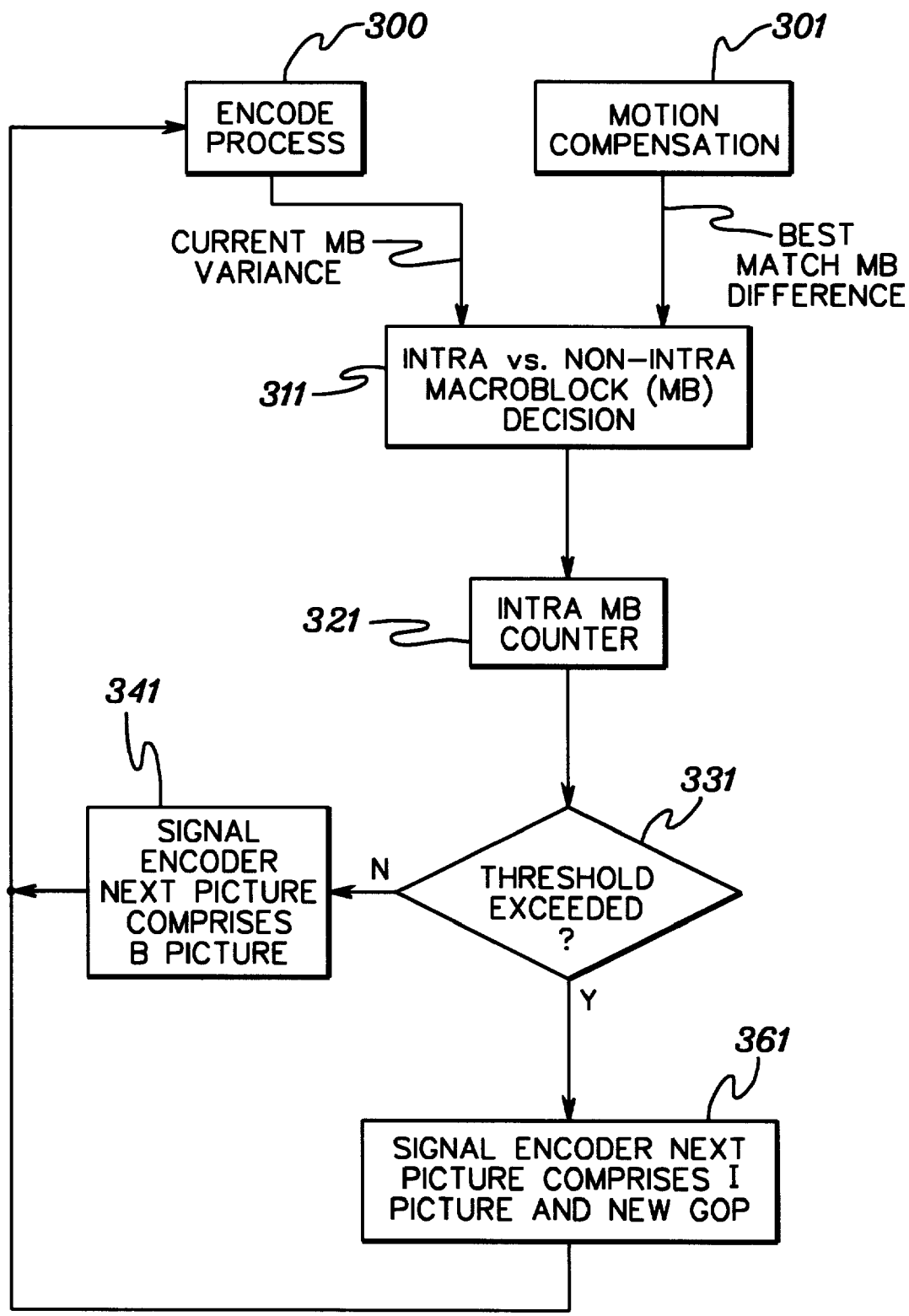
FIG. 6 is a flowchart of one embodiment of processing to dynamically determine a group of pictures (GOP) size in accordance with the present invention.

One embodiment of processing in accordance with this invention is depicted in FIG. 6. Motion compensation 301 provides a best-match macroblock difference to conventional decision logic which determines whether to encode the current macroblock as an intra or a non-intra macroblock 311. Simultaneous therewith, the current macroblock variance is also provided to the macroblock decision 311 via the encode process 300. From these inputs, one skilled in the art can readily implement the conventional decision logic represented by block 311.

If encoded as an intra macroblock, then in accordance with this invention an intra macroblock counter 321 is incremented, and processing determines whether the predefined threshold number of intra macroblocks within the current frame has been exceeded 331. If no, then the encode process is signaled to encode the next picture as a B picture 341. However, if the threshold has been exceeded, then processing signals the encode process to encode the next picture as an I picture, thereby beginning a new group of pictures 361. Signals 341 and 361 are fed to the encode process 371 as shown.

Those skilled in the art will note that the process of FIG. 6 comprises only one example of encoding decision and statistics gathering in accordance with this invention, and that others will be apparent from the disclosure presented herein. For example, multiple intraframe characteristics could be used to monitor picture change activity, and in particular, picture degradation from a reference frame at the beginning of each group of pictures. Further, the threshold can be any desired value. As a specific example, the threshold might comprise one percent of the total number of macroblocks comprising the picture rounded down to the nearest positive integer.

To summarize, this invention proposes a new encoding scheme useful, for example, in MPEG encoding a sequence of video frames. In the prior art, group of picture (GOP) size is pre-determined and consistent. In accordance with this invention, the length of each sequential GOP is dynamically defined by the picture activity. Thus, the encoder may have a first GOP of IBB followed by an IBBBBB GOP, followed by an IB, etc. The GOP is dynamically defined by allowing forward predicted only "B" frames to "string on" until a threshold (representative of a predefined picture degradation) is hit. In a preferred embodiment, the threshold is a number of intra-coded macroblocks in a "B" frame. When the threshold is reached, the next picture becomes an intra-coded "I" frame, thereby starting a new GOP, and the process repeats. The B frames always refer back to the I frame initiating the GOP. One-direction B frames are preferred, rather than P frames, to reduce the number of bits used to encode, and to reduce motion error.

The present invention can be included, for example, in an article of manufacture (e.g., one or more computer program products) having, for instance, computer usable media. The media has embodied therein, for instance, computer readable program code means for providing and facilitating the capabilities of the present invention. The articles manufactured can be included as part of the computer system or sold separately.

The flow diagrams depicted herein are provided by way of example. There may be variations to these diagrams or the steps or operations described herein without departing from the spirit of the invention. For instance, in certain cases the steps may be performed in differing order, or steps may be added, deleted or modified. All these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for encoding a sequence of video frames, said method comprising:

(a) encoding the sequence of video frames to produce an encoded bitstream;

(b) during said encoding (a), dynamically determining, as a function of frame variation between a frame and a reference frame within the sequence of video frames, a group of picture (GOP) length for at least one GOP of the encoded bitstream;

wherein said encoding (a) comprises encoding a frame of the sequence of video frames as an intra-coded (I) frame and employing forward prediction motion estimation based on said encoded I frame for each frame of a variable number of frames temporally subsequent to said encoded I frame, said I frame and said variable number of frames temporally subsequent thereto comprising said GOP length of said at least one GOP, and wherein said dynamically determining (b) comprises dynamically determining said variable number of frames temporally subsequent to said I frame to be encoded employing forward prediction motion estimation based on said encoded I frame, said encoded I frame comprising said reference frame; and wherein said encoding (a) comprises encoding each frame of said variable number of frames temporally subsequent to said I frame as a B frame, wherein said GOP length comprises said encoded I frame and said variable number of encoded B frames only.

2. The method of claim 1, wherein said encoding (a) comprises encoding the sequence of video frames in accordance with MPEG standard.

3. A method for encoding a sequence of video frames, said method comprising:

(a) encoding the sequence of video frames to produce an encoded bitstream;

(b) during said encoding (a), dynamically determining, as a function of frame variation between a frame and a reference frame within the sequence of video frames, a group of picture (GOP) length for at least one GOP of the encoded bitstream; and wherein said dynamically determining (b) comprises determining said GOP length by directing said encoding (a) to encode a frame of the sequence of video frames as an I frame, said I frame comprising said reference frame, and to encode subsequent frames of the sequence of video frames using motion estimation based on said I frame, and wherein said dynamically determining (b) further comprises beginning a new GOP when an encoded frame of said subsequent frames has a predefined picture degradation compared with said I frame.

4. The method of claim 3, wherein said dynamically determining (b) comprises for each frame of said subsequent frames comparing at least one characteristic thereof, derived relative to the reference frame, to a preset threshold, and wherein said dynamically determining (b) further comprises beginning said new GOP when said preset threshold is exceeded.

5. The method of claim 4, wherein said at least one characteristic comprises a number of intra-coded macroblocks within said frame of the subsequent frames, and wherein said threshold number comprises a percentage of a total number of macroblocks in said frame.

6. A system for encoding a sequence of video frames, said system comprising:

an encoder coupled to receive the sequence of video frames, said encoder producing therefrom an encoded bitstream;

means coupled to said encoder for dynamically determining, as a function of frame variation between a frame and a reference frame within the sequence of video frames, a group of picture (GOP) length for at least one GOP of the encoded bitstream produced by said encoder;

wherein said encoder comprises means for encoding a frame of the sequence of video frames as an intra-coded (I) frame and means for employing forward prediction motion estimation based on said encoded I frame for each frame of a variable number of frames temporally subsequent to said I frame, said I frame and said variable number of frames temporally subsequent thereto comprising said GOP length of said at least one GOP, and wherein said means for dynamically determining comprises means for dynamically determining said variable number of frames temporally subsequent to said I frame to be encoded employing forward prediction motion estimation based on said encoded I frame, said encoded I frame comprising said reference frame; and wherein said encoder comprises means for encoding each frame of said variable number of frames temporally subsequent to said I frame as a B frame, and wherein said GOP length comprises said encoded I frame and said variable number of encoded B frames only.

7. A system for encoding a sequence of video frames, said system comprising:

an encoder coupled to receive the sequence of video frames, said encoder producing therefrom an encoded bitstream;

means coupled to said encoder for dynamically determining, as a function of frame variation between a frame and a reference frame within the sequence of video frames, a group of picture (GOP) length for at least one GOP of the encoded bitstream produced by said encoder; and wherein said means for dynamically determining comprises means for determining said GOP length by directing said encoder to encode a frame of the sequence of video frames as an I frame, said I frame comprising said reference frame, and to encode subsequent frames of the sequence of video frames using motion estimation based on said I frame, and wherein said means for dynamically determining further comprises means for beginning a new GOP when an encoded frame of the subsequent frames has a predefined picture degradation compared with said I frame.

8. The system of claim 7, wherein said means for dynamically determining comprises means for comparing for each frame of said subsequent frames at least one characteristic thereof, derived relative to the reference frame, to a preset threshold, and wherein said means for dynamically determining further comprises means for beginning said new GOP when said preset threshold is exceeded.

9. The system of claim 8, wherein said at least one characteristic of each frame of said subsequent frames comprises a number of intra-coded macroblocks within said frame of the subsequent frames, and wherein said threshold number comprises a percentage of a total number of macroblocks in said frame.

10. An article of manufacture, comprising:

a computer usable medium having a computer-readable program code means embodied therein for causing a computer to affect encoding of a sequence of video frames, the computer-readable program code means in said article of manufacture comprising:

computer-readable program code means for causing a computer to affect encoding the sequence of video frames to produce an encoded bitstream;

computer-readable program code means for causing a computer to affect dynamically determining, as a function of frame variation between a frame and a reference frame within the sequence of video frames, a group of picture (GOP) length for at least one GOP of the encoded bitstream, said dynamically determining occurring during said encoding;

wherein said computer-readable program code means for causing a computer to affect encoding comprises computer-readable program code means for causing a computer to affect encoding a frame of the sequence of video frames as an intra-coded (I) frame and employing forward prediction motion estimation based on said encoded I frame for each frame of a variable number of frames temporally subsequent to said encoded I frame, said I frame and said variable number of frames temporally subsequent thereto comprising said GOP length of said at least one GOP, and wherein said computer-readable program code means for causing a computer to affect dynamically determining comprises computer-readable program code means for causing a computer to affect dynamically determining said variable number of frames temporally subsequent to said I frame to be encoded employing forward prediction motion estimation based on said encoded I frame, said encoded I frame comprising said reference frame; and wherein said computer-readable program code means for causing a computer to affect encoding comprises computer-readable program code means for causing a computer to affect encoding each frame of said variable number of frames temporally subsequent to said I frame as a B frame, and wherein said GOP length comprises said encoded I frame and said variable number of encoded B frames only.

11. An article of manufacture, comprising:

a computer usable medium having a computer-readable program code means embodied therein for causing a computer to affect encoding of a sequence of video frames, the computer-readable program code means in said article of manufacture comprising:

computer-readable program code means for causing a computer to affect encoding the sequence of video frames to produce an encoded bitstream;

computer-readable program code means for causing a computer to affect dynamically determining, as a function of frame variation between a frame and a reference frame within the sequence of video frames, a group of picture (GOP) length for at least one GOP of the encoded bitstream, said dynamically determining occurring during said encoding; and wherein said computer-readable program code means for causing a computer to affect dynamically determining comprises computer-readable program code means for causing a computer to affect dynamically determining said GOP length by directing said encoding to encode a frame of the sequence of video frames as an I frame, said I frame comprising said reference frame, and to encode subsequent frames of the sequence of video frames using motion estimation based on said I frame, and wherein said computer-readable program code means for causing a computer to affect dynamically determining further comprises computer-readable program code means for causing a computer to affect beginning a new GOP when an encoded frame of said subsequent frames has a predefined picture degradation compared with said I frame.

12. The article of claim 11, wherein said computer-readable program code means for causing a computer to affect dynamically determining comprises for each frame of said subsequent frames computer-readable program code means for causing a computer to affect comparing at least one characteristic thereof, derived relative to the reference frame, to a preset threshold, and wherein said computer-readable program code means for causing a computer to affect dynamically determining further comprises computer-readable program code means for causing a computer to affect beginning said new GOP when said preset threshold is exceeded.

13. The article of claim 12, wherein said at least one characteristic comprises for each frame of said subsequent frames a number of intra-coded macroblocks within said frame of said subsequent frames, and wherein said threshold number comprises a percentage of a total number of macroblocks in said frame.

* * * * *